Jan. 7, 1958  K. E. POPE  2,819,053
ACCELERATION INTEGRATOR
Filed March 20, 1957  3 Sheets-Sheet 1

INVENTOR:
Kenneth E. Pope
BY
Roland A. Anderson
Attorney

INVENTOR:
Kenneth E. Pope

Attorney

United States Patent Office 2,819,053
Patented Jan. 7, 1958

2,819,053

ACCELERATION INTEGRATOR

Kenneth E. Pope, Albuquerque, N. Mex., assignor, by mesne assignments, to the United States of America as represented by the United States Atomic Energy Commission Application March 20, 1957, Serial No. 647,460

6 Claims. (Cl. 264—1)

This invention relates to an improved acceleration integrator and more particularly to apparatus of this nature which is gyrostabilized.

It is frequently desirable, in an airborne vehicle, to provide automatic means for actuating electrical circuitry when the vehicle has attained a preselected velocity or has travelled a predetermined distance. This is usually accomplished by means of a device known as an accelerometer, adapted to be carried by the vehicle, which automatically integrates the instantaneous acceleration or velocity of the vehicle with respect to time.

A general object of this invention is therefore to provide new and improved means for actuating an electrical circuit in an airborne vehicle upon attainment of a desired velocity or the traversing of a desired distance by the vehicle.

It is known that the velocity of rotation of a shaft, to which is fixed a magnetized element containing a flux gap, may be damped by means of a light metallic cup known as an eddy-current drag cup, which exerts a restraining force upon the magnetic element when inserted within the flux gap. In the device to be described, this combination of elements is employed instead to produce a torque on the drag cup proportional only to the linear displacement of the cup within the flux gap of the magnetized element.

It is a further object of this invention, therefore, to provide an improved acceleration integrator which embodies a novel application of the eddy-current drag cup principle.

It is also desirable in certain circumstances to provide means for sensing the attainment by an airborne vehicle of a predetermined velocity or distance along a given vector path.

It is therefore a further object of this invention to provide a new and improved vehicle carried acceleration integrator which is sensitive only to linear acceleration of the vehicle directed along a given vector path.

The desired restrictive sensitivity of the acceleration integrator may be accomplished by means of gyrostabilization of the acceleration-sensitive elements of the integrator. Heretofore, this has been achieved by mounting the integrator upon a gyrostabilized platform. However, if this platform can be eliminated, a decided advantage will result in the form of reduced space requirements. In the device to be described, a magnetized element is enabled to perform a dual function, i. e., as a gyroscopic inertia element and as an integral part of an accelerometer. This duality of purpose will be seen to accomplish the elimination of the stabilized platform.

It is therefore another object of this invention to provide a gyrostabilized acceleration integrator in which the integrator itself forms a part of the stabilizing system and the need for a stabilizing platform is eliminated.

It is another object of this invention to make it possible to include an acceleration integrator within the size limitations of a standard gyro case.

It is a further object of this invention to devise a gyrostabilized acceleration integrator in which the output is independent of the forces involved in the integration.

Other and further objects and advantages of the invention will be clear to those skilled in the art upon an understanding of the description below of a preferred embodiment of the invention read in connection with the appended drawings made a part of this specification, in which.

In all figures, like numerals designate like elements.

Figure 1:
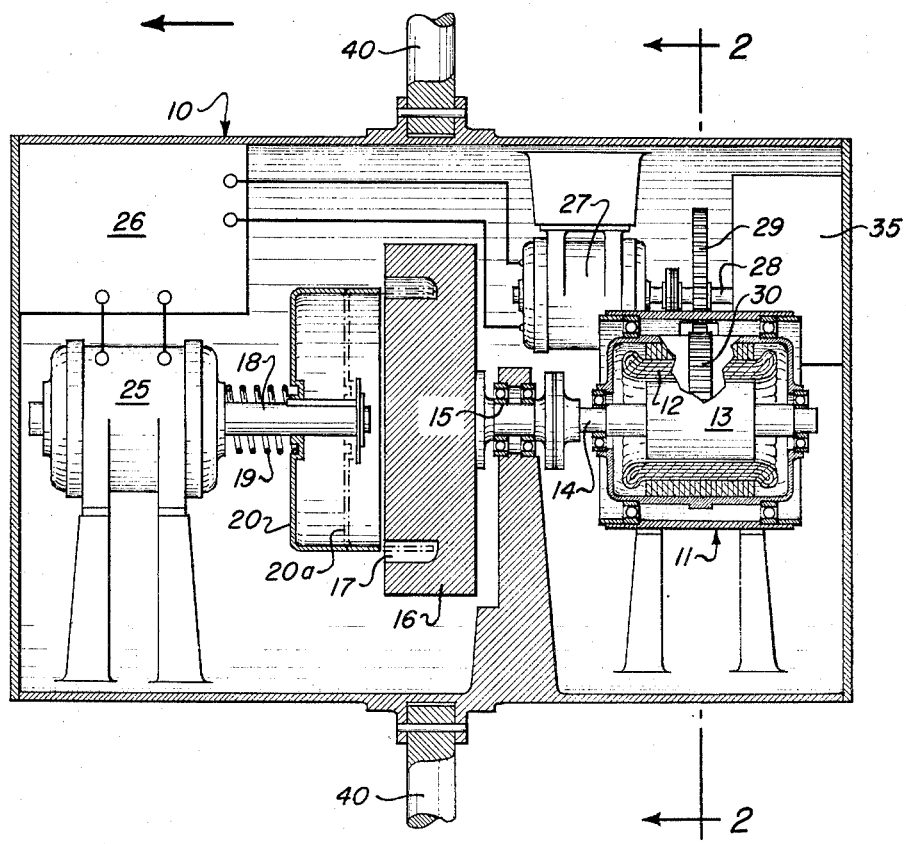
Fig. 1 shows a longitudinal section of the acceleration integrator and its outer housing, arranged to respond to an axial acceleration in one sense only, namely in the direction of the arrow.

Referring now to Fig. 1, numeral 10 designates a hermetically sealed rigid housing which may be rectangular or circular in cross section. Within housing 10 are found all the basic elements of the integrator. A synchronous motor 11 having a rotatable field case 12 and a rotor 13 is connected to shaft 14. Mounted on shaft 14 and supported by suitable bearings 15 is a magnetized element 16, an annular portion of which is removed to form flux gap 17. Slidably mounted on shaft 18 and restrained by coil spring 19, an eddy-current drag cup 20 is positioned so that it may enter flux gap 17 and occupy a position indicated by dashed lines 20a.

Shaft 18 is connected to a position servo transmitter 25. The voltage output of transmitter 25, which is proportional in amplitude to the position of shaft 18, is fed to a servo amplifier 26, which is, in turn, connected to an output motor 27. Motor 27 drives output shaft 28 which, through gear 29 and toothed peripheral portion 30, of rotary field case 12 completes a feedback loop to motor 11.

In operation, synchronous motor 11 is initially energized from an A. C. source (not shown) to rotate shaft 14 and magnetized element 16. The need for a synchronous motor will be shortly apparent.

In the case of acceleration of housing 10 in the direction of the arrow, drag cup 20 slides on shaft 18 in the direction of magnetic element 16 and penetrates flux gap 17 to an extent dependent upon the magnitude of the acceleration. The travel of drag cup 20 is opposed by coil spring 19, which exerts a restraining force on drag cup 20, increasing linearly with displacement. The resultant eddy-currents setup within drag cup 20 will generate a torque about its longitudinal axis which may be expressed by the formula:

$$T = KB^2AV$$

where $T$ = Torque generated about the longitudinal axis of drag cup
$K$ = Design constant
$B$ = Flux density of the magnetic field within element
$A$ = Area of hysteresis material within the magnetic field of element.

As the magnitude of the acceleration changes, area "A" will change in a manner such that T is in direct proportion to the magnitude of the acceleration. If we maintain B and V constant, then it may be seen from the formula that the torque applied to drag cup 20 will be directly proportional to the magnitude of acceleration applied to housing 10. The strength of the closed loop magnetic field of element 16 may be adjusted with due regard to the spring restraint, the expected forces of acceleration and other frictional forces involved.

The torque applied to drag cup 20 will produce angular acceleration thereof in accordance with the formula of $$T = \alpha I$$

where
α = Angular acceleration of drag cup, and
I = Moment of inertia of the drag cup and its supporting shaft This acceleration rotates drag cup 20 and shaft 18. This motion is picked up by servo transmitter 25. The resultant signal is fed through amplifier 26 to motor 27, which will assume the position of transmitter 25 and hence drive output shaft 28 at the same velocity as that imparted to shaft 18. Gear 29 meshes with toothed portion 30, causing field case 12 to rotate at the velocity of shaft 18. Since motor 11 is synchronous, rotor 13 will now increase its velocity with respect to housing 10, so that it always maintains the same differential velocity between the field case 12 and drag cup 20.

The rotational velocity of drag cup 20 with respect to magnetic element 16 will be maintained constant. As indicated above, this will insure that the torque applied to drag cup 20 will be proportional only to the linear acceleration applied to housing 10.

The rotational velocity of shaft 18 is proportional to the linear velocity of housing 10 and thus to that of the carrying vehicle in the direction of the acceleration. The angular displacement of shaft 18 is in like manner proportional to the linear distance traveled by housing 10.

As noted above, output shaft 28 will experience a rotation identical to that of shaft 18. For signal purposes, therefore, energy may be drawn from shaft 18 to actuate any suitable switching mechanism 35, which gives an indication of attained linear velocity or distance. The rotation of shaft 18 will be independent of the forces involved in the output signal from motor 27 and switching mechanism 35. Therefore, the only frictionally critical part of the assembly will be the drag cup and its associated mounts.

The feedback system consisting of servo transmitter 25, amplifier 26 and motor 27 is seen to function not only to maintain a constant relative velocity between magnetic element 16 and drag cup 20, but also to provide the torque to drive output shaft 28.

The power supplies and associated circuitry necessary to energize the various electrical elements in this integrator have been intentionally omitted from the description and drawings, as they form no part of this invention. Those versed in this art will have no difficulty in selecting means suitable for this purpose.

Figure 2:
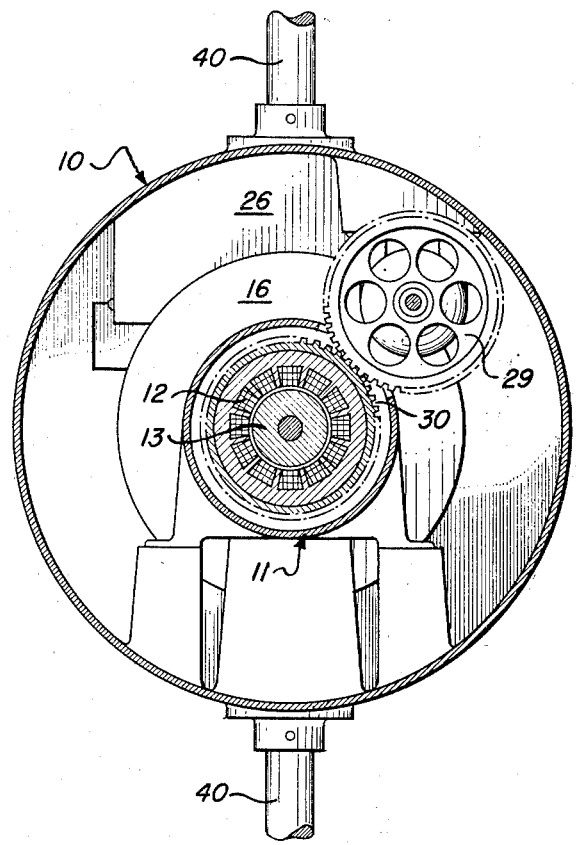
Fig. 2 shows a sectional view of the acceleration integrator taken along line 2—2 in Fig. 1.

Fig. 2 gives a more detailed view of the gearing arrangement between output motor 27 and input synchronous motor 11. Other configurations consistent with the scope of this invention will occur to those skilled in the art. For example, design considerations may dictate an "inside-out" construction for motor 11 in which field case 12 is placed inside rotor 13. Such modifications, however, will not affect the essential inventive features of this integrator.

Figure 3:
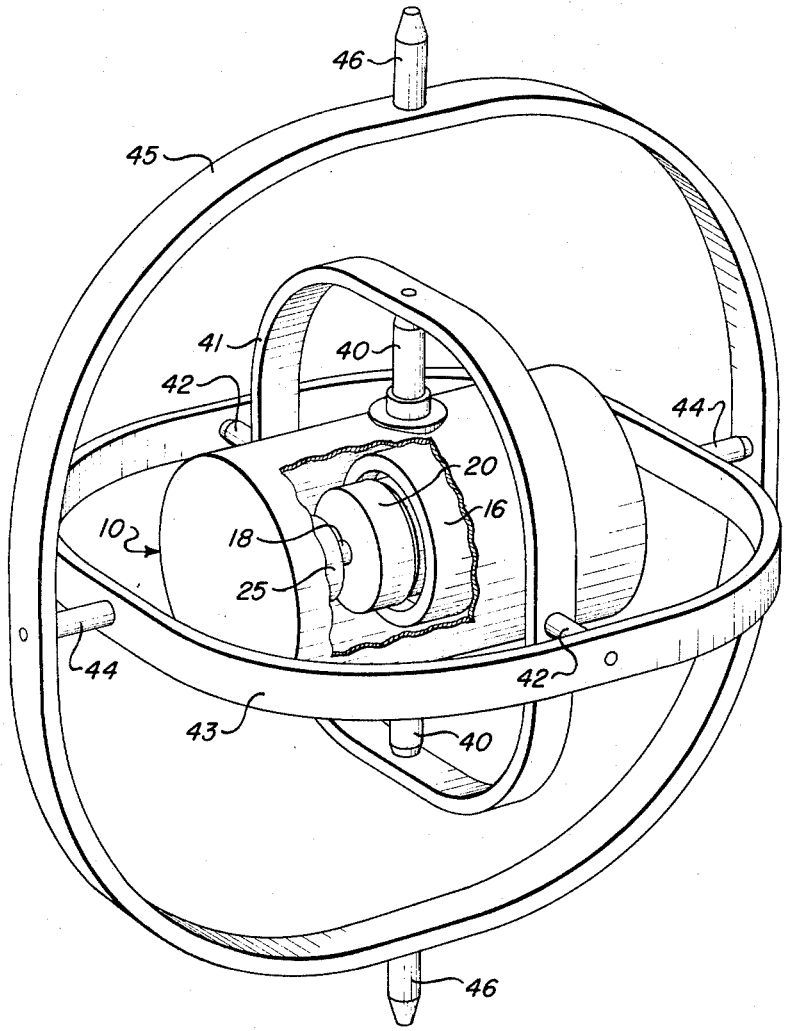
Fig. 3 shows a perspective view of the integrator casing mounted within its associated gimbals, with a portion of the casing cut away to show the position of essential internal elements.

Referring now to Fig. 3, we see a gyroscope system into which this integrator may be incorporated. Magnetic element 16 may be regarded now as the spinning intertia element of a gyroscope in addition to its function in the integrator as a source of torque upon drag cup 20. Fig. 3 illustrates the manner in which this dual function may be realized.

Housing 10 is mounted rigidly on shaft 40, which has an axis perpendicular to that of the spin axis of element 16. Housing 10 is thus enabled to rotate within gimbal 41, which is, in turn, rigidly mounted on shaft 42, having an axis perpendicular to that of shaft 40 and to the spin axis of element 16. Gimbal 41 is free to rotate within gimbal 43, which is rigidly mounted on shaft 44. Shaft 44 is rotatable within gimbal 45 which by servo means (not shown) is maintained orthogonal with gimbal 43.

Gimbal 45 may be rotatably attached by shaft 46 to the carrying vehicle. It will be noted that gimbal 45 is necessary to prevent gimbal lock and give the gyro 360° of freedom in all three reference planes.

Housing 10 is now seen to function itself as an additional gimbal and thus the entire mounting is that of a free gyroscope. The weight, moment of inertia, and speed of rotation of element 16 are design parameters which may be selected for the desired degree of gyroscopic accuracy. Of course, it is essential that the center of mass of housing 10, with its encased elements, be coincident with the center of rotation of the gimbal system.

It is clear that we have, in the manner described, eliminated the necessity for independent gyro stabilization of a platform upon which an acceleration integrator may be mounted, and we have likewise made it possible to include an acceleration integrator within the space limitations of a standard gyro case. But this result could not be achieved without the aid of the unique integrator principle detailed above. Thus, the gyroscope mount must be viewed in relation to the integrator, for therein lies its essential novelty.

It will now be seen that the present invention provides a new and improved acceleration integrator which is ideally suited for measurement of vector velocities and distances of a carrying vehicle.

It will be clear to skilled technicians that various changes may be made in the form, construction and arrangement of parts of this integrator without deviating from the scope of this invention or sacrificing any of its advantages. It is therefore to be understood that all matter herein should be regarded as illustrative and not as limitation.

What is claimed is:

1. An acceleration integrator comprising a rigid outer housing, a first shaft rotatably supported therein, a synchronous motor for driving said first shaft, said motor having a rotatable field case, a magnetized element having a cylindrical flux gap and mounted on said first shaft, a second shaft rotatably supported within the outer housing and axially aligned with the first shaft, a spring-restrained eddy-current drag cup slidably mounted on said second shaft and positioned to penetrate said flux gap in response to linear acceleration axially along said first and second shafts whereby a torque is applied to said drag cup proportional to said acceleration, feedback means responsive to the rotation of the second shaft for driving the field case of the motor at the velocity of the second shaft, and means for sensing the velocity of rotation and angular displacement of the motor field case.

2. A device as claimed in claim 1 in which the magnetized element forms the spinning inetria element of a free gyroscope, and the outer housing functions as a gimbal of said gyroscope.

3. An acceleration integrator comprising a rigid outer housing, a first shaft rotatably supported therein, a synchronous motor for driving said first shaft, said motor having a rotatable field case, a magnetized element having a cylindrical flux gap and mounted on said first shaft, a second shaft rotatably supported within the outer housing and axially aligned with the first shaft, a spring-restrained eddy-current drag cup slidably mounted on said second shaft and positioned to penetrate said flux gap in response to linear acceleration axially along said first and second shafts whereby a torque is applied to said drag cup proportional to said acceleration, a closed loop position servo connected between the second shaft and the motor field case whereby the motor field case is caused to rotate at the velocity of the second shaft, and means for sensing the velocity of rotation and angular displacement of the motor field case.

4. A device as claimed in claim 3 in which the magnetized element forms the spinning inertia element of a free gyroscope, and the outer housing functions as a gimbal of said gyroscope.

5. An acceleration integrator comprising a rigid outer housing, a first shaft rotatably supported therein, a synchronous motor for driving said first shaft, said motor having a rotatable field case, a magnetized element having a cylindrical flux gap and mounted on said first shaft, a second shaft rotatably supported within the outer housing and axially aligned with the first shaft, a spring-restrained eddy-current drag cup slidably mounted on said second shaft and positioned to penetrate said flux gap in response to linear acceleration axially along said first and second shafts whereby a torque is applied to said drag cup proportional to said acceleration, a position servo transmitter connected to the second shaft for generating a signal proportional in amplitude to the position of the drag cup, means for amplifying said signal, an output motor energized by said amplified signal, an output shaft driven by said motor, gearing means connected between the output shaft and the field case of the synchronous motor for driving said field case at the velocity of the second shaft, and means for sensing the velocity of rotation and angular displacement of the output shaft.

6. A device as claimed in claim 5 in which the magnetized element forms the spinning inertia element of a free gyroscope, and the outer housing functions as a gimbal of said gyroscope.

References Cited in the file of this patent

UNITED STATES PATENTS

| | | |
|---|---|---|
| 2,185,767 | Jeffries | Jan. 2, 1940 |

FOREIGN PATENTS

| | | |
|---|---|---|
| 144,740 | Great Britain | June 24, 1920 |
| 743,615 | Germany | Dec. 30, 1943 |